United States Patent [19]

Simpson

[11] Patent Number: 5,667,066
[45] Date of Patent: Sep. 16, 1997

[54] COLLAPSIBLE LAUNDRY HAMPER ASSEMBLY WITH LATCHING FEATURE

[75] Inventor: Danny Simpson, Seymour, Ind.

[73] Assignee: Seymour Housewares Corporation, Seymour, Ind.

[21] Appl. No.: 510,891

[22] Filed: Aug. 3, 1995

[51] Int. Cl.$^6$ .................................................... A45C 7/00
[52] U.S. Cl. .............................................. 206/278; 220/9.3
[58] Field of Search ................................. 383/33, 34, 117, 383/118, 104; 206/278, 282, 283; 220/9.3

[56] References Cited

U.S. PATENT DOCUMENTS

| | | | |
|---|---|---|---|
| 1,310,669 | 7/1919 | Morgan | 220/9.3 |
| 2,014,904 | 9/1935 | Martin | 220/9.3 |
| 2,574,563 | 11/1951 | Hieb | 220/9.3 |
| 3,286,752 | 11/1966 | Duryee, Jr. . | |
| 3,369,584 | 2/1968 | Faccio et al. . | |
| 3,388,882 | 6/1968 | Burroughs et al. | 383/34 X |
| 3,659,816 | 5/1972 | Wilson . | |
| 4,588,154 | 5/1986 | Basore . | |
| 4,646,802 | 3/1987 | Basore et al. | 383/33 X |
| 4,705,246 | 11/1987 | Wolf . | |
| 4,976,406 | 12/1990 | Buckley et al. . | |
| 5,078,508 | 1/1992 | Johan et al. . | |
| 5,507,577 | 4/1996 | Fowler | 383/33 X |

Primary Examiner—Jacob K. Ackun
Attorney, Agent, or Firm—King and Schickli

[57] ABSTRACT

A hamper assembly is provided having a tubular support frame and a mating bag. The frame comprises crossed first and second substantially rectangular sections that are coupled at the crossing points of the sections by elastomeric rings permitting pivotal movement, as well as lateral and longitudinal flexibility. A mating hamper bag is supported by the tubular frame and has two fabric side panels and a continuous U-shaped panel of mesh material that forms the two ends and bottom of the bag. The side panels are attached to loops along their upper edges that receive the top tubes of the hamper frame. A U-shaped stretch panel is attached along the lower edge of each side panel and extends around and under each bottom tube of the frame. With the hamper fully open, the stretch panel stretches the bottom panel to maximize the capacity of the bag. As the hamper is opened and closed, the bottom tubes slide on the stretch panel. As the two frame sections approach the over-center position, the stretch panel resists further movement in that direction, to provide a latching function that assists the bag in remaining open/closed during handling.

15 Claims, 2 Drawing Sheets

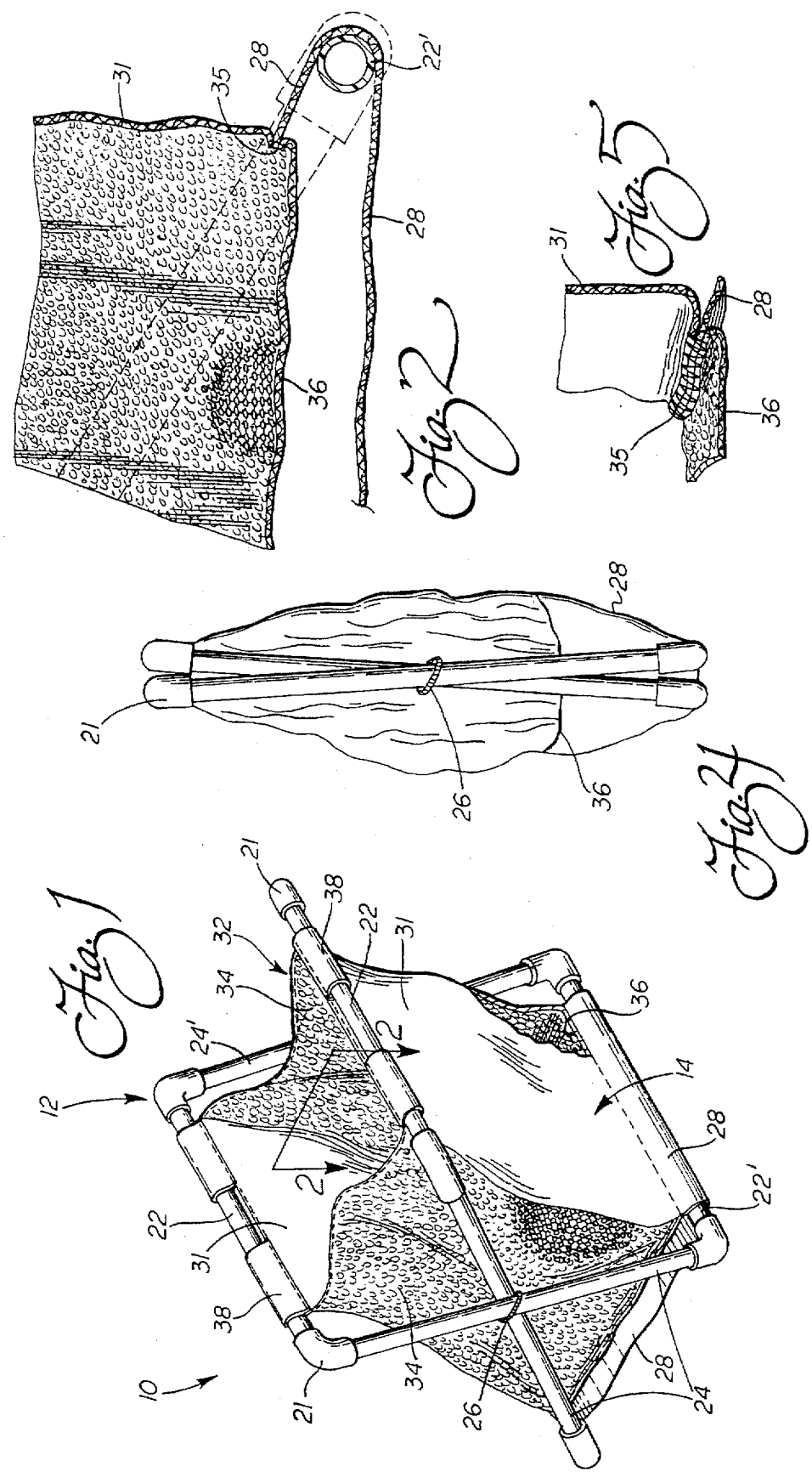

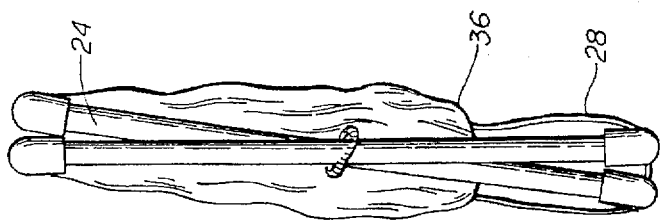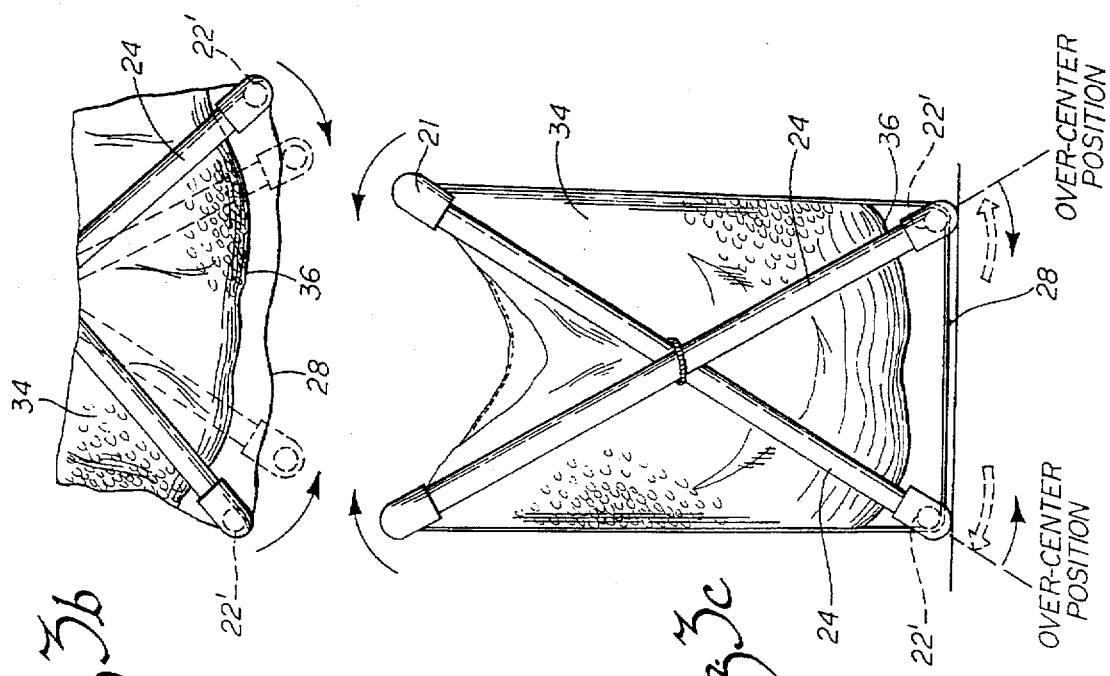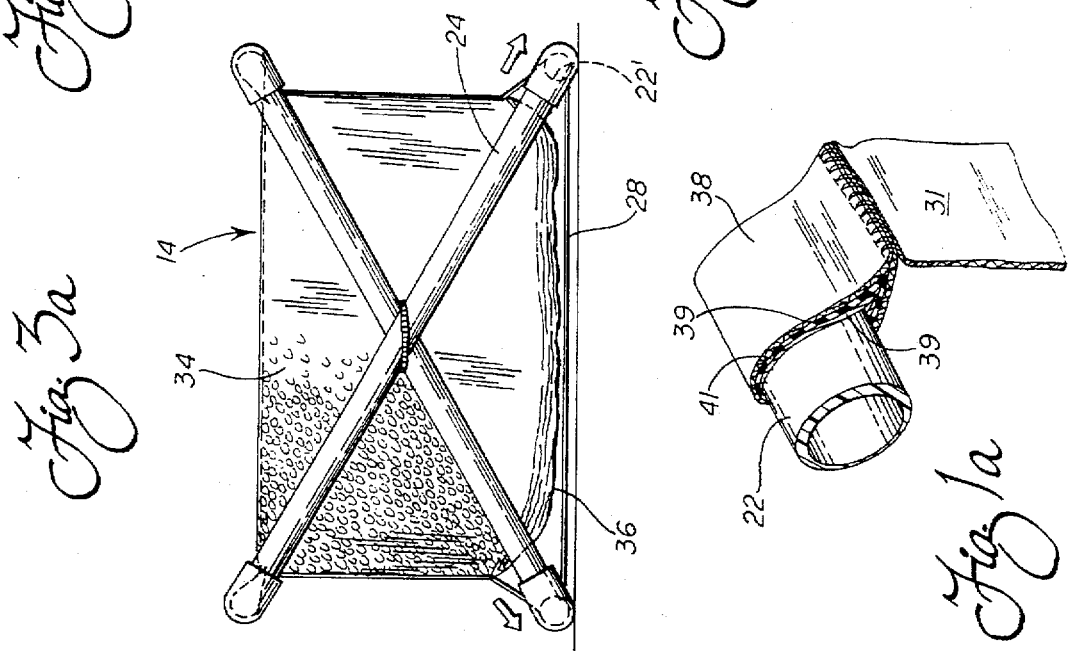

COLLAPSIBLE LAUNDRY HAMPER ASSEMBLY WITH LATCHING FEATURE

TECHNICAL FIELD

The present invention relates generally to a laundry hamper assembly; and more particularly, to an improved laundry hamper assembly or the like having a collapsible frame and a bag with a stretch panel that provides a latching feature and expands the bag to maximize capacity.

BACKGROUND OF INVENTION

Laundry hampers are commonly used in the home to collect and store laundry for later washing. The hampers disclosed in the prior art include two basic types: free-standing containers and support frame/bag designs. The free-standing containers typically are rectangular or oval in shape and are made of a hard, non-flexible material, such as plastic or wicker. With their rigid construction, these containers take up the same amount of space whether full or partially full of laundry. Thus, they are often too bulky to fit into narrow storage closets or tight spaces in a laundry room. Furthermore, because they are not collapsible they are not easily moved from one place to another. Also, storage in a small, particularly narrow space when not in use is not possible.

In response to these portability and storage restrictions, and other limitations inherent in the fixed frame hamper designs, several designs of foldable hampers have been attempted. These hampers typically include a relatively heavy metallic framework that supports a separate, generally flimsy bag that loosely hangs from the top of the framework. While appropriate for some commercial and/or large scale applications, these prior art designs have several features that make them ill-suited for use in a home environment, as well as other drawbacks.

One such folding hamper is disclosed in U.S. Pat. No. 3,286,752 to Duryee. Two U-shaped frame members including crossed legs are formed from metal tubing and positioned to overlap near their midpoints. The frame members pivot about these midpoints on bolts inserted into aligned, permanent holes in the legs. A nut tightened onto each bolt secures the connection and spacers are placed between the overlapping members to provide the fixed pivoting joint. A cooperating bag is secured to the top cross members of the frame.

This type of hamper assembly has several disadvantages. With regard to use in the home, it is too bulky for easy portability and/or storage. Furthermore, the use of a fixed joint for the legs of the frame members allows only rotational movement about a fixed axis and provides no lateral or longitudinal flexibility. Additionally, the '752 hamper provides no means for securing and/or holding open the bag adjacent the lower part of the frame. Instead, a separate platform is used at the bottom of the frame as a base to passively support the bag from below. This platform further increases the weight of the hamper, making it more difficult to move and carry, and also makes folding the hamper much more cumbersome.

Another disadvantage with the prior art collapsible hampers is that none assist the user in keeping the frame and bag open/closed during transport and handling. Rather, the frame is free to pivot between fully open and closed positions. This allows gravity to pull the hamper open while it is being carried, thereby interfering with its transport, or closed when the hamper is inadvertently tipped over.

The hamper bags per se disclosed in the prior art also suffer from several shortcomings. For example, most bags typically have a rounded, undefined bottom that cannot be attached to the support frame so as to be assured of being held open along their full depth. A prior art bag with this design is shown in U.S. Pat. No. 3,369,584 to Faccio, et. al.

A significant improvement over the prior art hampers and bags is provided by the Applicant's co-pending U.S. patent application Ser. No. 08/379,244, filed on Jan. 25, 1995. This application discloses a hamper assembly that includes a light weight tubular frame that resiliently pivots about elastomeric rings. The mating hamper bag includes bottom support loops that are secured to the collapsible hamper frame to hold open the bag. While these support loops assure that the bottom of the bag is held open when the frame is in an open position, they also close the bottom of the bag when the frame is folded closed. In this manner, a portion of the available storage space in the closed position is eliminated.

Thus, there is a need identified for a collapsible/portable hamper assembly for holding laundry or other articles that provides a pivoting frame and a mating bag that cooperates with the frame to maximize holding capacity along its full depth and to provide a latching feature that secures the assembly in an open position.

SUMMARY OF INVENTION

In accordance with the purposes of the present invention as described herein, an improved collapsible/portable hamper assembly for laundry, and within the broadest aspects of the invention, for other articles, is provided. The hamper assembly includes a hamper frame and mating bag that are particularly adapted for use in a home setting, or otherwise limited space. In the preferred embodiment, first and second substantially rectangular frame sections are pivotally joined by an elastomeric ring to form a collapsible frame. Each rectangular frame section is fabricated of four elongated tubes, preferably of substantially rigid plastic, and connected at right angles by four elbow couplings. Further details of the construction and operation of the frame are found in the Applicant's co-pending U.S. patent application Ser. No. 08/379,244, filed on Jan. 25, 1995, the specification of which is incorporated herein by reference.

In an important and novel aspect of the present invention, a mating hamper bag with a cooperating stretch panel is provided for use with the collapsible frame. The bag comprises two flexible side panels (left and right), a flexible and continuous U-shaped panel that forms the two end (front and back) and bottom panels and a stretch panel extending beneath the bottom panel. Preferably, all bag panels are made from single ply material, and the U-shaped panel is made from a mesh material to supply a measure of breathability. In alternative embodiments, one or more of the panels includes either a single or multiple-ply fabric construction. In the multiple-ply version, there are two soft fabric outer plies and at least one inner ply of interfacing material for enhanced stiffness and shape-retention.

The U-shaped panel (front, back and bottom panels) and the left and right side panels are sewn together along their adjacent peripheries to form the bag and create an open rectangular top for loading and unloading. Each of the two side panels also includes two support loops along its top edge. Each loop preferably comprises two outer fabric layers and an inner coating of heat activated adhesive that bonds the outer layers together. The loops are folded over and sewn about the top cross member of the respective first or second rectangular frame sections. In this manner, expansion of the bag is advantageously maximized at the top. Alternatively, the continuous U-shaped panel is replaced by a bottom panel and separate end panels that are sewn together in a U-shape.

A stretch panel is attached to the lower edge of each side panel along the same seam to which the bottom panel is secured. The stretch panel extends around and under each bottom tube of the hamper frame and continues along the underside of the bag below and substantially parallel to the bottom panel. The stretch panel is sized to stretch and extend the bottom panel downwardly and outwardly when the hamper is in a fully open position. In this manner, the stretch panel insures that the storage space in the bottom of the bag is maximized, and the hamper always presents a generous, wide-open aperture for easy loading and unloading. In an alternative embodiment, the side panels and stretch panel comprise a single, continuous U-shaped panel.

When the hamper is in a fully open position, the stretch panel and end panels are pulled substantially taut and maintain the hamper in the open position. As the hamper frame is pivoted toward the closed position, tension is temporarily released from the stretch panel, but tension is reapplied upon reaching the over-center position. In other words, at the over-center position, the stretch panel is pulled taut and presses upwardly on the underside of the bottom tubes to provide a folding resistance. In this manner, the stretch panel performs a latching function by keeping the frame from passing the over-center position, thereby assisting the user in keeping the bag open during handling.

As the frame continues to be pivoted toward the closed position, once the stretch panel does pass over-center, the hamper is then assisted in being held closed. That is, the latching function of the stretch panel now advantageously prevents the bag from being fully opened without applying firm, outward pressure on the top cross tubes to move beyond the over-center position.

The side (left and right) and end (front and back) panels are all slightly shorter than the height of the frame. In this manner, the edges of the bottom panel are suspended above the stretch panel to give the bag a clean, box-like appearance. Additionally, the bottom panel includes sufficient material to allow downward bowing at the bottom of the bag to further maximize the capacity of the hamper.

Still other objects of the present invention will become apparent to those skilled in this art from the following description wherein there is shown and described a preferred embodiment of this invention, simply by way of illustration Of one of its modes best suited to carry out this invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

FIG. 1 is a perspective view of a collapsible hamper assembly of the present invention for laundry or the like showing the hamper frame and a mating bag in a partially open position; the illustration in this Figure, and in FIG. 2, includes only a portion of the mesh construction of the preferred side/bottom panels in detail.

FIG. 1A is an enlarged broken away view showing a support loop at the top of a side panel and extending over a frame top tube; the loop having two outer layers and an inner coating of adhesive interfacing, and being stitched to the edge of the side panel.

FIG. 2 is a cross section view taken along line 2—2 in FIG. 1 showing the stretch panel extending under the bottom tube and continuing beneath and substantially parallel to the bottom panel.

FIG. 3a is an end/front view showing the hamper assembly in a fully open position.

FIG. 3b is a partial end/front view showing in dashed outline/action arrows the frame pivoting from the fully open position toward the over-center position.

FIG. 3c is an end/front view showing the frame nearing the over-center position and illustrating by solid action arrow the direction of movement of the frame and by dashed action arrow the resistance to this movement provided by the taut stretch and side panels.

FIG. 3d is an end/front view of the hamper assembly in a fully collapsed position showing the compact profile and footprint of the hamper that allows for easy transport and storage.

FIG. 4 is an end/front view of the hamper assembly partially filled in a collapsed position showing the free expansion of the bag allowed by the stretch panel.

FIG. 5 is an enlarged cut away section of a bottom corner of the hamper bag showing the side, bottom and stretch panels converging to form an inwardly directed seam that is bound by cross stitching.

DETAILED DESCRIPTION OF THE PREFERRED EMBODIMENT

Reference is now made to FIG. 1 illustrating the preferred embodiment of an improved collapsible hamper assembly according to the present invention, and generally represented by the reference numeral 10. The hamper 10 is particularly suited for use in a home setting or other environments for holding laundry and where space is limited. Of course, in accordance with the broader aspects of the present invention, the hamper assembly can be used as a suitable storage device for other articles, such as toys, fabric for sewing, yarn for knitting or the like.

The hamper assembly 10 is comprised of a pivoting frame 12 and a mating hamper bag 14 mounted on the frame. The hamper frame 12 is constructed of first and second rectangular frame sections that are pivotally joined at their midpoints by a coupling means. Each rectangular section is comprised of four elongated tubes: two horizontal top/bottom tubes 22, 22' and two perpendicular end or front/back tubes 24, 24'. These tubes are connected at right angles by elbow couplings 21 to form the frame sections.

In the preferred embodiment a resilient coupling means is utilized to pivotally couple the two frame sections together. Preferably, the resilient coupling means comprises an elastomeric ring 26 that is fabricated from a resilient plastic or rubber material. Advantageously, the elastomeric ring 26 permits the frame sections to resiliently pivot between open and closed positions with a floating pivot action. Additional details and advantages of the construction and operation of this hamper frame are covered in the previously mentioned '244 application.

In accordance with an important and novel aspect of the present invention, a mating hamper bag 14 with a cooperating stretch panel 28 is provided. The bag 14 is specifically constructed to operate with the frame 12 of the hamper assembly 10. As best illustrated in FIG. 1, the bag includes two flexible side panels 31 and a flexible and continuous U-shaped panel, generally designated by the reference numeral 32, that forms two end panels 34 and a bottom panel 36. Preferably, all of the panels are made from a single ply material, and the U-shaped panel 32 is made from an open mesh or netting material, such as woven nylon. In this manner, the bag 14 has a measure of breathability to avoid the accumulation of odors, mildew and the like.

In an alternative embodiment, one or more of the panels may include a multiple-ply construction. Two outer plies are made from a soft and pliable fabric. At least one inner ply of suitable interfacing material, such as polyester filler, provides enhanced stiffness and gives the panels a measure of shape-retention.

The end and bottom panels 34, 36 that comprise the U-shaped panel 32 are secured along their peripheries to the adjacent edges of the side panels 31, preferably by stitching in a criss-cross pattern. Each of the two side panels 31 also includes two support loops 38 attached to its top edge. As shown in FIG. 1A, in the preferred embodiment each loop 38 has a multi-layer construction for enhanced durability comprising two outer layers 39 and an inner coating 41. Preferably, the inner coating 41 is a heat-activated or thermo-responsive adhesive that bonds the two outer layers 39 together. Each loop 38 is folded over to receive the top tube 22 of the respective first or second frame section. The loops 38 provide full peripheral support for the top portion of the bag 14 and ensure that expansion of the upper bag portion is maximized when the hamper frame 12 is in a fully open position. It should be appreciated that within the broader aspects of the present invention, a single loop 38 or a plurality of loops 38 may be utilized with each side panel 31. Additionally, the present invention contemplates replacing the U-shaped panel 32 with separate fabric or mesh end panels and/or a separate fabric or mesh bottom panel that are individually sewn together along their common edges.

With reference to FIGS. 1 and 2, a stretch panel 28, preferably made of the same fabric as the side panels 31, extends around and under each bottom tube 22' and below and substantially parallel to the bottom panel 36. As described in more detail below, the stretch panel 28 is sized to cooperate with the frame 12 to provide a stabilizing latching feature as the frame nears the over-center position, as well as other benefits.

As best seen in FIG. 5, the stretch panel 28 is secured along a common seam with the side panel 31 and the bottom panel 36. The edges of these panels are directed inwardly and sewn together in a criss-cross pattern to form a fin seam 35 that runs along the entire length of the side and bottom panels 31, 36. Alternatively, the side panel 31 and stretch panel 28 are formed from a single, continuous U-shaped panel to which the edge of the bottom panel 36 is sewn.

Advantageously, the stretch panel 28 is sized to cooperate with the hamper frame 12 in an unique way to stretch and extend the bottom panel downwardly and outwardly when the hamper is in a fully open position. As shown by the action arrows in FIG. 3a, the stretch panel 28 ensures that the bottom panel 36 is expanded to nearly its full lateral width, thereby maximizing the available storage space in the bottom of the bag 14. In this manner, and in combination with the upper support loops 38, the stretch panel 28 prevents the bag 14 from bunching inwardly, and ensures that the bag presents wide-open apertures at both top and bottom portions for easy loading and unloading.

In a further novel and important aspect of the present invention, the stretch panel 28 provides a latching feature that assists in stabilizing the hamper assembly 10 in an open or closed position during handling. As shown in FIG. 3a and described above, when the hamper is in a fully open position, the stretch panel 28 and end panels 34 are pulled substantially taut and maintain the hamper in the open position. With reference now to FIG. 3b, as the hamper frame 12 is pivoted toward the closed position, tension is temporarily released from the stretch panel 28 and end panels 34, thereby allowing the bottom tubes 22' to slide freely along the slackened stretch panel. This freely moving pivot action continues until the hamper frame 12 nears the over-center position.

As illustrated in FIG. 3c, as the front/back tubes 24, 24' approach the over-center position, the stretch panel 28 is again pulled taut along with the side panels 31 (not shown). At this point, the stretch panel 28 presses upwardly on the underside of the bottom tubes 22' to provide a folding resistance, indicated by the dashed action arrows. In this manner, the stretch panel 28 effectively "latches" the hamper in the open position by keeping the frame from passing through the over-center position. Advantageously, this latching feature assists the user in keeping the bag open and helps prevent the hamper from inadvertently closing when it is bumped, jarred or tipped over. This feature is particularly useful during handling and/or transport of the hamper, when movement and jostling are frequent.

Once the hamper frame 12 is pivoted past the over-center position, the bottom tubes 22' again slide freely along the slackened stretch panel 28 until the frame reaches the fully closed position as shown in FIG. 3d. Advantageously, in the same manner as described above, the stretch panel 28 assists the hamper in remaining in a Closed position. In other words, the latching function of the stretch panel 28 prevents the bag 14 from being fully opened without the application of firm outward pressure on the top cross tubes 22 that forces the frame 12 beyond the over-center position. Additionally, in this closed position the hamper has a narrow profile and small footprint for easy transport and convenient storage in small closets or other tight spaces.

As clearly shown in FIGS. 3a–3d and described above, the stretch panel 28 is not secured to the bottom tubes 22', but merely extends around the outer circumference of the tubes and allows the tubes to slide over its surface. Thus, as shown in FIG. 4, the bottom panel 36 is free to stretch and expand and the bag 14 may remain partially filled with laundry or other items when the frame 12 is in the fully closed position. Advantageously, the stretch panel 28 thereby allows maximum use of available bag space even when the hamper is in the closed position.

As best seen in FIGS. 1 and 3c, the side and end panels 31, 34 are all slightly shorter than the height of the frame 12. With this construction, the bottom panel 36 is suspended above the stretch panel 28 to give the bag 12 an aesthetically pleasing, box-like appearance. Additionally, to further ensure that the hamper assembly 10 provides maximum storage capacity, the bottom panel 36 includes supplemental material that allows the bottom panel to hang loosely downwardly when the hamper frame 12 is in the fully open position, as shown in FIG. 3a. With this construction, the bottom panel 36 easily flexes or bows downwardly when filled with laundry or other items. It follows that this extra material allows the bottom panel 36 to be suspended above the stretch panel 28 without compromising the storage capacity of the hamper.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, in one such embodiment or modification, one or more cross panels (not shown) can be sewn to a midpoint(s) of the side and bottom panels 31, 36 in order to form a multiple compartment hamper assembly. All such modifications and variations are within the scope of the invention as determined by the appended claims when interpreted in accordance with breadth to which they are fairly, legally and equitably entitled.

I claim:

1. A collapsible and portable hamper assembly having a frame and a mating bag for storing and transporting articles, said bag having a first open position and a second closed position, said assembly comprising:

a first substantially rectangular frame section;

a second substantially rectangular frame section crossing said first section at spaced points to form said frame into a substantially X-shape;

coupling means for pivotally coupling said first and second frame sections together at their crossing points; and a bag positioned inside said frame, said bag having at least two side panels, two end panels, a bottom panel and a stretch panel, said stretch panel affixed to the lower edges of said side panels adjacent said bottom panel, said stretch panel extending under said frame and said frame slidably cooperating with said stretch panel, said stretch panel having a length relative to the height of said frame sections so as to provide a latching function to assist in maintaining the hamper assembly in said first open position or said second closed position.

2. The hamper assembly as set forth in claim 1, wherein each of said first and second rectangular frame sections comprises:

two elongated front/back tubes being disposed substantially upwardly with respect to the frame;

two elongated top/bottom tubes being disposed substantially horizontally with respect to the frame; and elbow couplings for connecting said tubes together.

3. The hamper assembly as set forth in claim 2, wherein said coupling means is resilient and said front/back tubes of said first frame section are pivotally coupled to said front/back tubes of said second frame section at substantially their midpoints by said resilient coupling means.

4. The hamper assembly as set forth in claim 3, wherein said resilient coupling means comprises an elastomeric ring being disposed around the midpoint of each pair of said front/back tubes.

5. The hamper assembly as set forth in claim 2, wherein said stretch panel extends around and under each of said horizontal bottom tubes such that said bottom tubes slide relative to said stretch panel during opening and closing of said frame, said stretch panel being sized to cooperate with said frame to provide a latching function as said frame sections approach the over-center stretch position.

6. The hamper assembly as set forth in claim 1, wherein each of said side and end panels is shorter than the height of said frame in a fully open position, whereby said bottom panel is suspended above said stretch panel.

7. The hamper assembly as set forth in claim 1, wherein the upper edge of each of said side panels is attached to at least one support loop that is folded over and sewn about the adjacent horizontal top tube, whereby the top of said bag is securely supported by said loops.

8. The hamper assembly as set forth in claim 7, wherein said support loop comprises two outer layers and an inner adhesive coating bonding said outer layers together.

9. The hamper bag as set forth in claim 8, wherein said end panels and said bottom panel are formed from a first continuous flexible U-shaped panel, said first U-shaped panel being secured to adjacent side and bottom edges of each of said side panels.

10. The hamper bag as set forth in claim 8, wherein said side panels and said stretch panel are formed from a second continuous flexible U-shaped panel, said second U-shaped panel being secured to adjacent edges of said bottom and end panels.

11. The hamper bag as set forth in claim 9, wherein said end panels and said bottom panel are formed from an open mesh material to provide breathability to said hamper bag.

12. The hamper bag as set forth in claim 8, wherein at least each of said end panels includes:

two outer layers being made of a soft and pliable fabric material, and at least one inner layer disposed between said outer layers and being made of an interfacing material layer that enhances the stiffness and shape retention of said panels.

13. The hamper bag as set forth in claim 8, wherein said bottom panel includes sufficient material to allow bowing at the bottom of said bag to maximize the capacity of said bag.

14. The hamper assembly as set forth in claim 1, wherein said latching of the stretch panel is provided at the over-center position during folding of the frame sections between said first open and second closed positions.

15. A collapsible hamper bag for holding articles and for use with a collapsible frame, comprising:

two flexible side panels;

two flexible end panels;

a flexible bottom panel;

a flexible stretch panel affixed to the lower edges of said side panels; and a plurality of seams interconnecting said panels, said panels forming a substantially rectangular bag with an open top and said stretch panel stretching when slidably cooperating with said frame, the length of said stretch panel being sized relative to the height of said frame so as to maximize the capacity of said bag, whereby upon mounting on said frame said stretch panel extends under said frame and said frame slidably cooperates with said stretch panel, said stretch panel having a length relative to the height of said frame so as to provide a latching function to assist in maintaining the hamper bag in a first open position or in a second closed position.

* * * * *